July 30, 1940.     F. B. ROWLEY     2,209,614
DUST COUNTER
Filed May 28, 1937     2 Sheets-Sheet 1
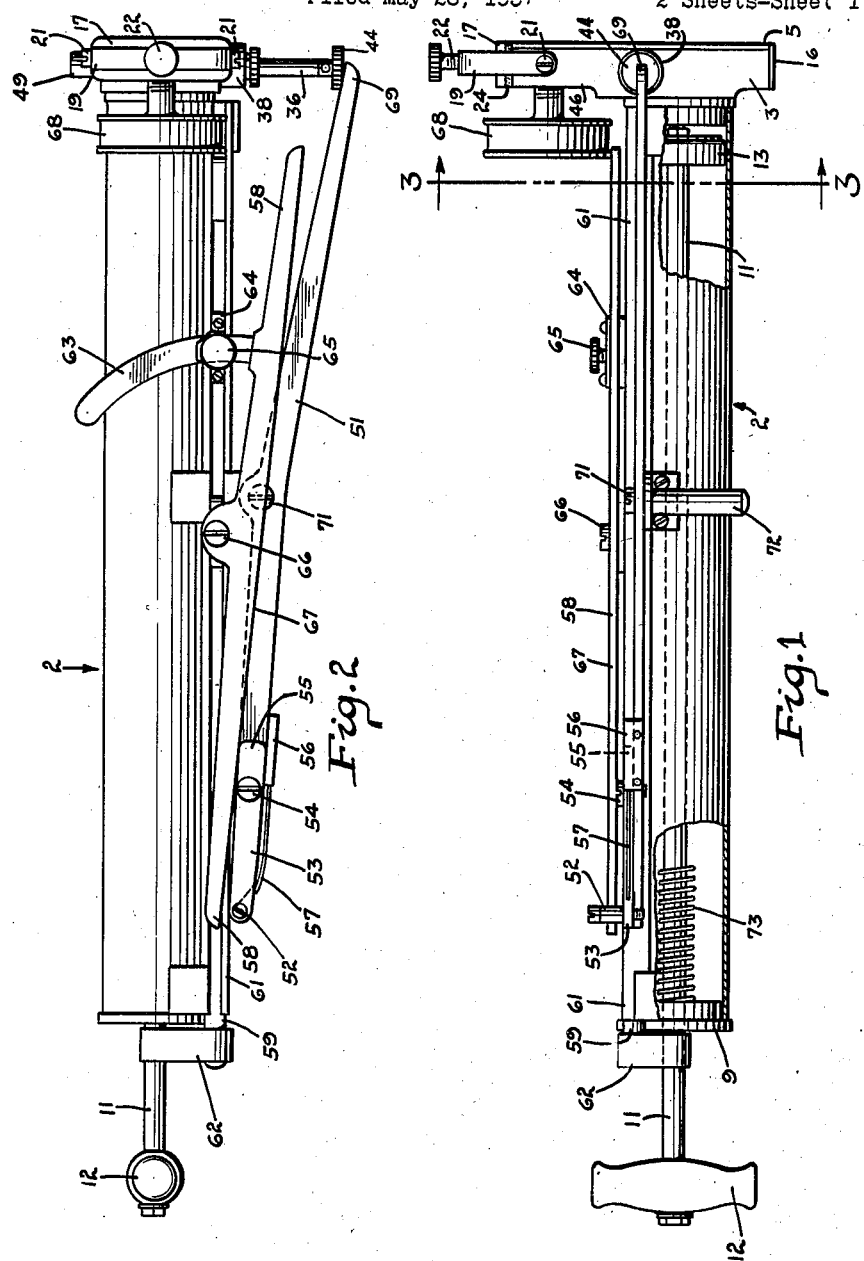
INVENTOR
FRANK B. ROWLEY
ATTORNEYS INVENTOR
FRANK B. ROWLEY
BY Paul, Paul Moore
ATTORNEYS Patented July 30, 1940

2,209,614

UNITED STATES PATENT OFFICE 2,209,614

DUST COUNTER

Frank B. Rowley, Minneapolis, Minn.

Application May 28, 1937, Serial No. 145,397

5 Claims. (Cl. 73—51)

This invention relates to new and useful improvements in dust counters or apparatus for measuring or ascertaining the number of dust particles in a given volume of air.

All atmospheric or free air contains dust, and the dust concentration thereof may vary considerably in different localities. Because air is essential to life, it is of utmost importance that some means be provided whereby the dust concentration of air may be substantially accurately determined, so that it may be definitely known whether or not the air in any given space or room is injurious to health, or creates other hazards. In some industrial plants, the dust concentration may be relatively high, thereby creating a very dangerous situation from a health standpoint. It is not a simple matter to accurately measure or ascertain the dust concentration of a given volume of air, primarily because of the infinite number of invisible dust particles which are often contained in the air, and which are extremely difficult to separate from the air and evaluate.

The possible hazards of dusts depend upon their chemical and physical characteristics, and their concentrations in the air. Many investigations have been made by technical institutions and others, to determine the condition or purity of the air in numerous industrial plants, and the results of such investigations have definitely shown that the air in some plants is exceedingly detrimental to health, because of the relatively high dust concentration thereof. It is, therefore, of utmost importance that some means be provided whereby the condition of the air in a given space or room may conveniently be periodically checked, thereby to ascertain the dust concentration thereof.

In spite of the fact that a large amount of investigational work has been done concerning the amount of dust in the air, to the best of my knowledge, no practical method has, as yet been devised and accepted for measuring the amount of dust in various samples of air or for rating the quality of air in regard to its dust content. The dust particles in the air are extremely fine, the greater majority of them not being visible without the aid of a microscope. The concentrations of particles of dust runs from a few thousand to many millions of particles per cubic foot of air. In order to know whether or not, any dust constitutes a physical or other hazard, it is desirable to have as a part of the information, its concentration, or the numbers of particles contained in a given volume of air, their approximate size, and the physical characteristics thereof. This information cannot be obtained by any simple visual method, such as that often used for determining the relative density of smoke or fumes in the air. In such cases, a stream of smoke or fumes may be projected against a relatively rough surface or paper which will collect a sample that may be compared in color, density of path, or other visible characteristics, to a standard sample, thus giving a qualitative analysis only. Such methods may be adapted to a comparative rating for the density of fumes or smoke, but it is impossible to use them to measure the amount of dust in the air which we breathe.

Even though there are large numbers of dust particles per cubic foot in the average air, samples of this air drawn through any of the well-known smoke or fume recording devices now in use, would show absolutely nothing as to the number of dust particles for a given volume of air. By any of the methods now used for rating the density of fumes or smoke drawn into the apparatus, it would be impossible to get any accurate results whatsoever by the use of a microscope, due first to the fact that the particles would not be effectively collected, and secondly, the surfaces used for collecting the dust in such apparatus are so rough and uneven that the particles collected could not be focused in the field of the microscope. Such smoke recording devices are of an entirely different class than the instruments used to count dust particles in the air, and should not be confused with them. With smoke and fumes, it is not necessary to count the actual particles. The density is so great that a partial collection and rough visual comparison is usually sufficient. Dust particles suspended in air are very fine, and, as compared with smoke and fumes, are very much more scattered in the air and impossible to detect by any of the ordinary visual methods.

Because the dust particles are so minute or infinitesimal, and further, because they are so widely scattered in the air, the problem of accurately measuring or ascertaining the dust concentration of a given volume of air, becomes far more difficult, and requires the use of a highly sensitive instrument, which should be so constructed that in the dust sample or record collected thereby, the dust particles are so deposited on the record plate, that they may readily be accurately counted, when the plate is placed under a high-powered microscope. The actual dust count method makes it necessary to deal with dust in very small quantities of the air. For instance, in many cases, it is impossible to actually count the particles in more than a fraction of a cubic inch of air.

While no single method of measuring dust in the air has yet been accepted as a standard, several dust counting methods have been devised and used with some success. In general, these methods may be divided into two classes: first, that in which the dust is washed out of a large quantity of air, and an actual count made with a microscope on a small fraction of the washing liquid, thus giving a dust count which, by calculation, may be used to show the count in any definite volume of the original air taken into the sampling device; and secondly, a method in which the dust particles are separated from the air by impinging a stream of the dust laden air onto a smooth, sticky surface which will retain the dust particles in a concentrated mass, and whereby the collected dust particles may be placed under a microscope and counted.

In the first method, above mentioned, a comparatively large volume of air is passed through a water or other liquid washer, which retains a large percentage of the dust particles. A sample of the liquid is then diluted and placed under a microscope and a dust count taken of that part which falls within the field of the microscope, which is only a small fraction of the water used. From this count, the dust in the original air is calculated. In the second method, the dust particles are collected on a small area of the surface of a record plate, whereby the dust particles are, in effect heaped one on top of another. This dust sample is then placed under a microscope and the particles of the mass "counted."

I have found, from actual experience, that in many cases, it is impractical or even impossible to use the washing method, due to the time involved or the kind of dust in the air. In the washing method, relatively large volumes of air must be drawn through the washer, thus taking a considerable period of time for gathering the sample and, in addition to this, a final sample must be prepared in the laboratory, and the dust allowed to settle out of the prepared sample for a period varying from 15 to 30 minutes, before the count can be taken. This method is therefore not well adapted for field work, where it is highly desirable that a method be employed which permits samples to be quickly taken at any time, and whereby the dust particles of the sample may be readily and quickly counted to immediately measure or ascertain the dust concentration of the air in any room or space. There are many kinds of dust such, for example, as oily carbon, which cannot be taken out by washing, and therefore their concentration in the air cannot be determined by the washing method.

I have also found by experience that it is impossible, in most cases, to make an accurate determination of the amount of dust in the air by any of the viscous plate type of counters thus far developed. There are at least two important elements lacking in each of them, with which I am familiar. In the air operated or suction type, air is usually drawn in by the stroke of a pump, or similar method, and the dust from the complete volume of the sample is deposited in a single spot on the sampling plate. By this method, the velocity of impingement of the air against the sampling plate varies from zero to maximum, and then down to zero through the sampling stroke of the pump. A uniform percentage of dust cannot be taken from the air by such varying air velocities, and therefore such samples cannot be relied upon as giving representative dust counts. The concentration of dust in many samples of air is not so great that the sample must be confined to a fraction of a cubic inch, if all of the dust particles are to be collected in a single spot and counted under a microscope. It is impossible with any of the methods now in use to get air samples of such small volume which will deposit representative samples of the dust in the air.

It is therefore, highly desirable that a novel method and apparatus be provided, whereby the dust particles of a given volume of air may be collected and so disposed or arranged upon a suitable surface, that when placed under a microscope, all of the particles contained in the collected sample, may readily and conveniently be counted, whereby the concentration of dust in the air in any given space or room may readily and quickly be accurately measured to determine the condition of the air.

An important object of the present invention, therefore, is to provide an apparatus, whereby the dust concentration of air may be accurately measured or ascertained, and which does not require the services of a skilled mechanic or technician to operate it.

A further object of the invention resides in the provision of a dust counter comprising a plate having a suitable surface for receiving a sample of dust, and which counter is so constructed that the dust is deposited upon said plate in an elongated sample of uniform density, and in which the dust particles are so disposed that they may readily be counted, when placed under a microscope.

A further object is to provide an apparatus for measuring or determining the number of dust particles contained in a given volume of air, which comprises a plate having a viscous coated surface, and a mechanism for impinging a stream of dust laden air against the surface of said plate at a uniform velocity and simultaneously moving the plate at a predetermined speed with respect to the velocity of the air stream, the speed of the plate being regulated to suit the concentration of dust in the air, and whereby the dust particles contained in the air stream are deposited upon the surface of the plate in an elongated pattern of uniform density, whereby the dust particles may readily be accurately counted, when placed under a high-powered microscope.

A further and more specific object of the invention is to provide an apparatus of the class described, comprising a dust separation chamber having a plate movably mounted therein, and a wall of said chamber being provided with a small orifice through which dust laden air may be drawn into the chamber, and means being provided for drawing air through said orifice into the chamber at a uniform rate of flow and simultaneously moving the plate beneath or past the orifice, whereby the dust particles contained in the air are deposited on the surface of the plate in an elongated pattern of uniform dust density, whereby the dust content of a given volume of air may readily be measured or counted to accurately determine the dust concentration of the air in a given room or space.

Other objects of the invention reside in the novel construction of the apparatus, which is provided with suitable adjustments for adapting it to meet all conditions, where such an apparatus may be used; in the provision of means whereby the density of the dust particles collected on the record plate may be relatively varied for any given volume of air, thereby to facilitate the counting of the dust particles contained in the sample; and, in the provision of a dust counter comprising a cylinder having a dust separation chamber communicating with one end thereof and provided with a suitable air intake orifice, and said chamber having a record plate movably supported therein and adapted to receive a dust sample, and means being provided for maintaining a constant vacuum in said chamber and simultaneously moving the record plate beneath or past the orifice, whereby dust particles drawn into the chamber through said orifice will be deposited upon the surface of said plate in an elongated pattern of uniform density; and, in the simple and inexpensive construction of the apparatus, which is compact and convenient to operate and readily lends itself for manufacture in quantity production at small cost.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a side elevation of an apparatus designed to carry out my invention;

Figure 2 is a plan view of Figure 1;

Figure 3:
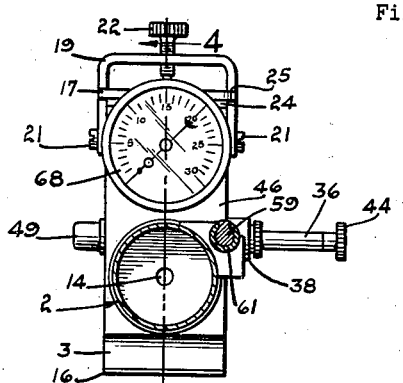
Figure 3 is a sectional elevation on the line 3—3 of Figure 1.

In the selected embodiment of the invention here shown, there is illustrated in Figures 1 and 2, for purposes of disclosure, an apparatus comprising a cylinder, generally indicated by the numeral 2, and having a casing 3 at one end whose walls define a vacuum or dust separation chamber 4. The end wall 5 of the casing 3 is removably supported by suitable screws 7, and is provided with a small orifice 8 through which air may be drawn into the chamber 4.

Figure 4:
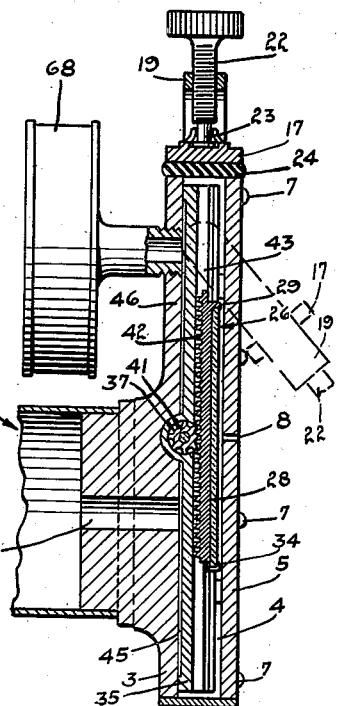
Figure 4 is an enlarged detail sectional elevation on the line 4—4 of Figure 3.

A head 9 is suitably secured to the opposite end of the cylinder 2 and guidingly supports a piston rod 11 provided at its projecting end with a suitable hand grip 12. A piston 13, of conventional construction, is secured to the opposite end of the piston rod 11, and is operative within the cylinder by manipulation of the piston rod 11. A suitable passage 14 establishes communication between the interior of the cylinder 2 and the dust separation chamber 4, as best illustrated in Figure 4.

Figure 5:
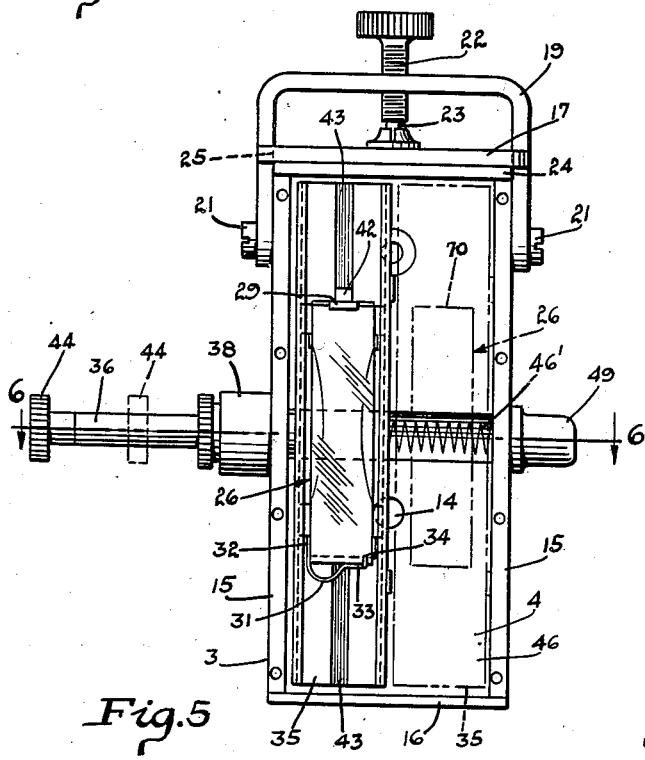
Figure 5 is an end view of the apparatus, with the cover removed from the chamber to illustrate the record plate supported therein.

The cover 5 is secured to the side walls 15 and bottom wall 16 in hermetically sealed relation. The upper wall 17 of the chamber 4 is removably supported by such means as a yoke 19, pivoted at 21 to the side walls 15 and having a suitable screw 22 received in threaded engagement therewith, whose terminal 23 is adapted to engage the top wall 17 to retain it in closed position, as shown in Figures 4 and 5. A suitable packing or gasket 24 is interposed between the top wall 17 and the adjacent ends of the walls of the housing 3, to provide an air tight joint therebetween. The top wall 17 is shown having its ends suitably notched, as indicated at 25, to retain it in position with respect to the yoke 19.

A suitable record plate, generally indicated by the numeral 26, is movably supported within the chamber 3, and is adapted to pass beneath or past the orifice 8, when the apparatus is operated, as will subsequently be described. One side of the record plate 26 is covered with a suitable viscous or sticky material to provide a surface adapted to receive the dust particles, and to which said particles will adhere so that the plate may be conveniently removed and placed under a microscope for counting the dust particles.

Figure 7:
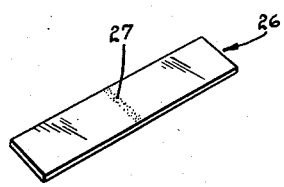
Figure 7 is a perspective view of the record plate removed from the chamber and showing a dust sample deposited thereon.

An important feature of the present invention resides in the novel manner of depositing the dust particles upon the surface of the record plate 26, whereby they are disposed in an elongated pattern, as indicated at 27 in Figure 7, extending crosswise of the plate, and whereby the dust pattern or sample on the plate will be of uniform dust density, so that the particles thereof may readily be counted.

To thus collect and deposit the dust particles of a given volume of air upon the surface of the plate 26, the plate is supported in a suitable holder 28, having a clip 29 at one end for engaging the end of the plate 26, and provided at its opposite end with a suitable retaining spring 31, secured at 32 to the holder 28 and having its free end 33 provided with spaced prongs 34 between which one end of the plate is received, as clearly illustrated in Figures 4 and 5. The spring 31 removably supports the plate 26 in the holder 28, whereby it may readily be removed therefrom, as will subsequently be described.

Figure 6:
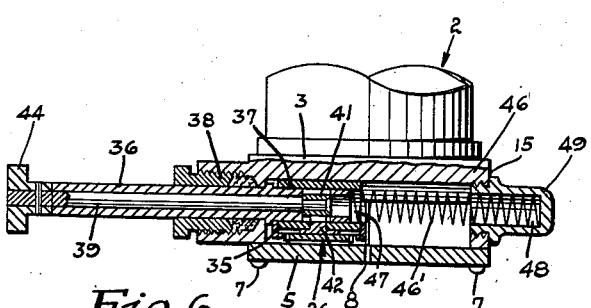
Figure 6 is a detail sectional view on the line 6—6 of Figure 5.

The holder 28 is mounted for longitudinal sliding movement in a suitable carriage 35 supported within the chamber and having one end of an elongated tubular member or hub 36 secured in a bore 37 provided therein, as best illustrated in Figure 6. The tubular member 36 is slidingly received in a suitable packing box 38, provided in one of the side walls 15 of the casing 3, as best illustrated in Figure 6. A shaft 39 is shown rotatably supported in the member 36 and is provided at its inner end with a small pinion 41 which meshes with a rack 42 provided on the adjacent side of the holder 28. The rack 42 is slidable in a longitudinal groove 43 provided in the carriage 35. A suitable finger grip 44 is secured to the outer end of the shaft 39, whereby the shaft may be conveniently rotated to longitudinally translate the holder 28 in the carriage 35, when it is desired to remove the record plate 26 from the chamber 4. A space 45 is provided between the bottom of the carriage 35 and the adjacent or back wall 46 of the casing 3, to permit free air circulation through the passage 14, when the carriage passes over said passage, as will be understood by reference to Figures 4 and 5.

A suitable spring 46' has one end seated in a small socket 47 provided in the carriage 35, and its opposite end received in a socket 48 provided in a plug 49 received in threaded engagement with a wall 15, shown at the right hand side of Figures 5 and 6. The spring 46' constantly urges the carriage into the position shown in Figures 5 and 6, wherein the record plate 26 is out of registration with the intake orifice 8, as best illustrated in Figure 6.

Means is provided for moving the carriage 35 from the full to the dotted line position, shown in Figure 5, during the operating stroke of the apparatus, and at a predetermined speed with respect to the velocity of the air drawn into the chamber 4 through the orifice 8.

In Figures 1 and 2, I have shown a mechanism for simultaneously operating the carriage 35, when air is drawn into the chamber 4 to deposit a dust sample on the surface of the plate 26. The mechanism herein disclosed, is shown comprising a lever, generally indicated by the numeral 51, having one end arranged to engage the terminal or knurled head 44 of the shaft 39. The opposite end of the lever 51 has a pin 52, which is mounted in a member 53, shown pivoted to the lever 51 by a suitable pivot 54. The end portion 55 of the member 53 engages a limit stop 56, carried by the lever 51, and against which it is normally held by a suitable spring 57. By this arrangement, the pin 52 is yieldably connected to the lever 51, so that should the carriage reach the limit of its movement against the tension of the spring 46', before the piston rod has been moved to the limit of its outward movement, no damage will be done to the parts.

A suitable cam bar 58 is shown adjustably secured to a rod 59, mounted for sliding movement in a suitable guide 61 secured to the cylinder 2. A connecting member 62 is secured to one end of the rod 59 and to the piston rod 11, whereby the rod 59 is movable as a unit with the piston rod 11. The cam bar 58 is shown provided with a suitable segment member 63, slidingly supported in a guide 64 and adapted to be secured against movement in said guide by a suitable clamping or adjusting screw 65, illustrated in Figures 1 and 2. By loosening the screw 65, the cam bar 58 may be relatively adjusted about the supporting pivot 66 to vary the angle of the cam edge 67 thereof, with respect to the axis of the piston rod 11. The pin 52 is adapted to engage the edge 67 of the cam bar 58, when the piston rod 11 is pulled outwardly, as will readily be understood by reference to Figure 2. A suitable vacuum gauge, generally indicated by the numeral 68 is secured to the back wall 46 of the casing 3 and is in direct communication with the dust separation chamber 4.

In the operation of the novel apparatus herein disclosed, the plate 26 is secured in position on the holder 28, and the top wall 17 of the chamber 4 is then secured in position by manipulation of the clamping screw 22. The apparatus is then preferably supported in substantially the position shown in Figure 1, and the piston drawn outwardly at a certain rate of speed, determined by the vacuum to be maintained in the chamber 4. The gauge 68 will register the vacuum in the chamber 4, and is so positioned that the operator may readily see it while operating the piston rod 11. By maintaining a predetermined vacuum in the chamber 4, during the suction stroke of the piston rod 11, air is drawn into the chamber through the orifice 8 at a uniform rate of flow, which is of utmost importance in order to obtain a true dust sample.

The air thus drawn into the chamber through the orifice 8, impinges against the viscous-coated surface of the record plate 26, whereby the dust contained in said air is deposited on the surface of the plate in an elongated pattern of substantially uniform dust density, as indicated at 27 in Figure 7.

The operating mechanism for the carriage 35 is so adjusted that the end portion 69 of the lever 51 will begin to move the tubular member 36 inwardly immediately following the initial movement of the piston 13, whereby the operator may move the piston at a rate of speed to maintain a constant vacuum in the chamber 4 during the full operating stroke of the apparatus, or until the plate 26 has passed beneath the orifice 8, from the full to the dotted line position, indicated at 70 in Figure 5.

The lever 51 is supported on a fixed pivot 71, suitably secured to the cylinder and is actuated by the edge 67 of the cam bar 68 engaging the pin 52, when the piston rod 11 is pulled outwardly, as will readily be understood by reference to Figure 2. The tension of the spring 57 is such as to overcome friction of the parts and the tension of spring 46' so that, in normal operation, member 53 will not pivot relative to lever 51. The cam edge 67 of the cam bar 58 is so shaped that the movement imparted to the carriage 35 will be uniform the full length of its travel, and whereby it bears a definite relation to the traveling movement of the piston 13. By varying the angle of the cam edge 67, the speed of travel of the carriage with respect to the movement of the piston 13 may be varied to suit the concentration of dust in the air.

When the apparatus has been operated to deposit a sample of dust upon the surface of the plate 26, the clamping screw 22 is unscrewed or loosened, to permit the upper wall 17 to be moved to an inoperative position, as indicated in dotted lines in Figure 4, whereby the upper end of the casing 3 is opened to permit the removal of the record plate 26 from the chamber 4. To remove the plate 26, the knurled head 44 of the shaft 39 is rotated in one direction, whereby one end of the holder 28 may be projected from the upper open end of the casing, so that the operator may readily grasp the holder with his fingers and remove it bodily from the carriage, if he so desires. The record plate 26 is then removed from the holder and placed under a powerful microscope, whereby the dust particles deposited on the surface thereof may readily and conveniently be counted.

A suitable post 72 is secured in fixed relation with respect to the cylinder 2, and cooperates with the lower wall 16 of the casing 3 to support the apparatus in the position shown in Figure 1. A suitable cushion spring 73 may be mounted on the piston rod 11, within the cylinder, and has one end engaging the head 9 and its opposite end adapted to be engaged by the piston 13, thereby to cushion the outward movement of the piston.

By depositing the dust particles in an elongated pattern upon the surface of the record plate 26, as shown at 27 in Figure 7, the collected dust particles on the surface of the plate 26, which represent the dust content of a given volume of air, may readily be counted, as hereinbefore stated. If the air is heavily laden with dust, the operating mechanism of the carriage may be operated to travel at a slightly higher rate of speed, with respect to the vacuum maintained in the dust separation chamber, in order that the particles collected on the record plate will be spread over a relatively greater surface, thereby to facilitate counting them. If the dust content of the air is very light, it may be desirable to adjust the cam bar in such a manner as to retard the movement of the carriage, thereby causing the dust particles collected from a given volume of air to be deposited in a more concentrated form on the record plate. The adjustability of the cam bar 58 thus makes it possible to control the depositing of the dust particles upon the surface of the record plate, whereby the pattern of dust particles collected from a given volume of air may be varied to suit the concentration of dust in the air, and to facilitate counting.

In the accompanying drawings I have shown, and in the specification described in detail, a simple, but practical apparatus embodying my invention. It is to be understood, however, that the specific disclosure is for the purpose of exemplification only, and that the scope of the invention is defined in the following claims, in which I have endeavored to distinguish it from the prior art so far as known to me.

I claim as my invention:

1. In a dust counter, a dust separation chamber having an orifice in a wall thereof, a suction device for drawing atmospheric air through said orifice into the chamber at a uniform velocity, a holder within the chamber, a record plate removably supported on the holder and having a surface for receiving dust particles drawn into the chamber through said orifice, and means for moving the holder to impart lateral uniform movement to the plate, whereby a transverse area thereof is exposed to the orifice to receive dust particles drawn into the chamber through said orifice, and whereby an elongated dust record of uniform density, is deposited on the plate.

2. In a dust counter, a dust separation chamber having an air intake orifice, a suction pump connected to the chamber, a plate removably supported in the chamber and having a surface for receiving dust particles, means operated by the pump for simultaneously moving said plate at a predetermined uniform speed with respect to a given vacuum in the chamber, and means for varying the timing between the suction of the pump and the movement of the plate, whereby the apparatus is adapted for taking dust samples of air of different dust concentrations.

3. In a dust counter, a cylinder having a casing at one end whose walls define a dust separation chamber, means establishing communication between the cylinder and chamber, a wall of the casing having an air intake orifice, a plate movably supported in the chamber, a piston operatively mounted in the cylinder and whereby dust laden air may be drawn into the chamber through said orifice, and a mechanism operatively associated with the piston and adapted to move said plate beneath said orifice at a predetermined uniform speed, whereby dust particles drawn through said orifice are deposited on the surface of said plate in an elongated pattern of uniform density, and whereby the dust particles on said plate may readily be counted, when the plate is placed under a microscope, thereby to determine the dust content of the air in a given space or room.

4. In a dust counter, a dust separation chamber having an air intake orifice, a suction device connected to the chamber, a record plate removably supported in the chamber and having a surface for receiving dust particles, means operated by actuation of the suction device for simultaneously moving said plate at a predetermined uniform speed with respect to a given vacuum in the chamber, and means for varying the travel of the record plate with respect to the vacuum in the chamber, whereby the apparatus is adapted for taking dust samples of different dust concentrations.

5. In a dust counter a dust separation chamber, a member having an orifice opening into said separation chamber for the introduction therein of gas carrying dust particles from without the chamber, a suction device for drawing gas carrying dust into the chamber through said orifice at uniform velocity, a holder member for holding a record plate in juxtaposition to the orifice containing member for the deposit on the record plate of dust entering through the orifice, a carriage movable in a fixed limited path and supporting one of the juxtaposed members for movement relative to the other of said members whereby dust entering the orifice will be deposited in a path across the record plate determined by the movement of the carriage.

FRANK B. ROWLEY.